United States Patent [19]

Gilman

[11] 3,825,387

[45] July 23, 1974

[54] QUICK-CHANGE DIE AND ROLLER ASSEMBLY

[75] Inventor: Robert W. Gilman, San Francisco, Calif.

[73] Assignee: California Pellet Mill Company, San Francisco, Calif.

[22] Filed: Mar. 30, 1972

[21] Appl. No.: 239,555

Related U.S. Application Data

[63] Continuation-in-part of Ser. No. 141,303, May 7, 1971, abandoned.

[52] U.S. Cl................ 425/182, 287/53 R, 425/331
[51] Int. Cl............................................. B29f 3/012
[58] Field of Search.................... 425/182, 331, 154; 287/DIG. 5, DIG. 9, 53 R, 52 R

[56] References Cited
UNITED STATES PATENTS

| | | | |
|---|---|---|---|
| 1,929,869 | 10/1933 | Hasner | 287/DIG. 13 X |
| 2,240,660 | 5/1941 | Meakin | 425/154 |
| 2,251,470 | 8/1941 | Stacy | 287/53 R |
| 2,314,208 | 3/1943 | Gurewitsch | 287/DIG. 5 X |
| 2,981,212 | 4/1961 | Landers | 425/331 X |
| 3,139,844 | 7/1964 | Landers | 425/162 |

*Primary Examiner*—J. Spencer Overholser
*Assistant Examiner*—David S. Safran
*Attorney, Agent, or Firm*—Bruce & McCoy

[57] ABSTRACT

A quick-change die and roller assembly for a pellet mill wherein the quill shaft supporting the die around the extrusion rollers is provided with a quick-release means which is biased by spring pressure to engage a groove to hold the quill shaft in the pellet mill.

12 Claims, 13 Drawing Figures

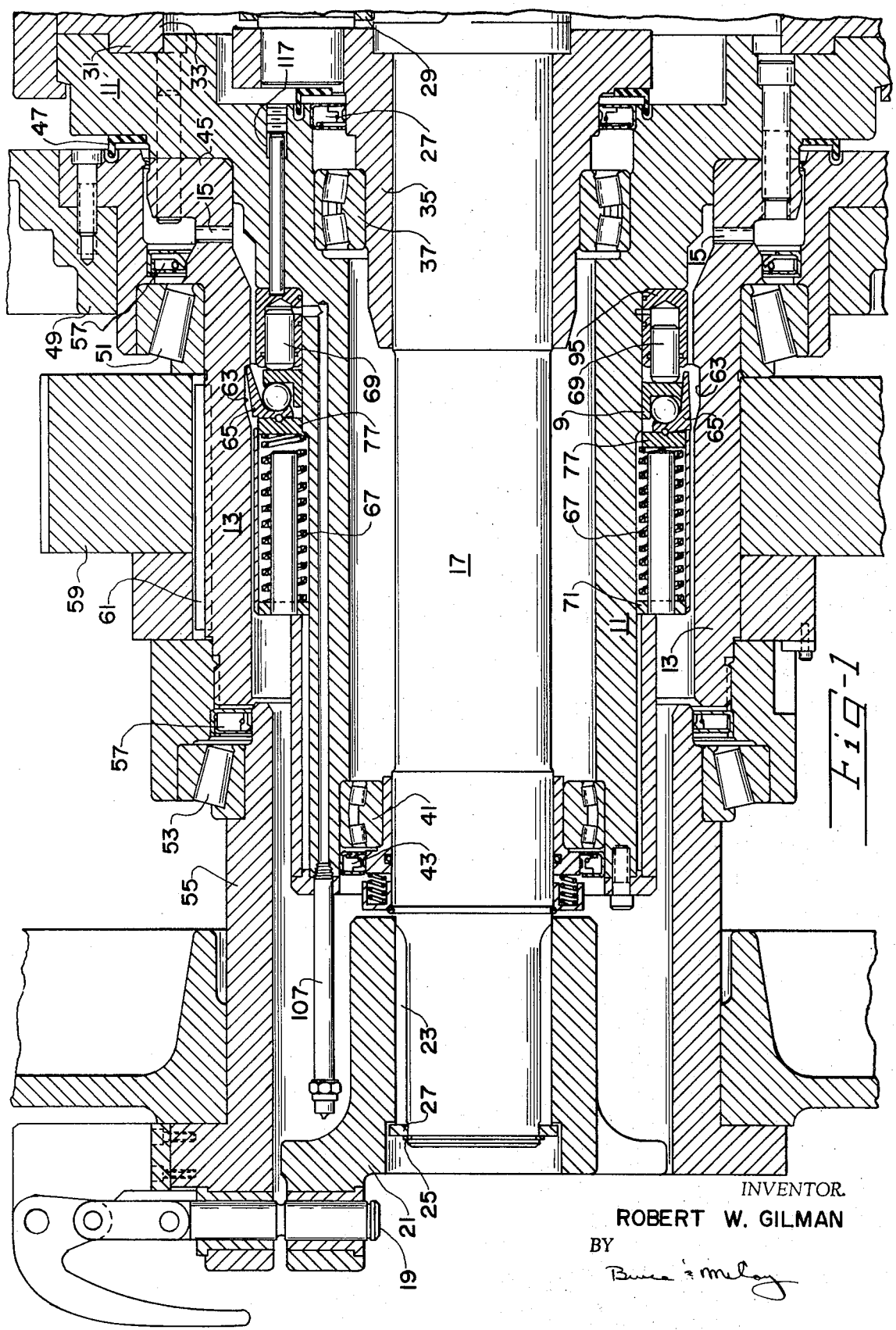

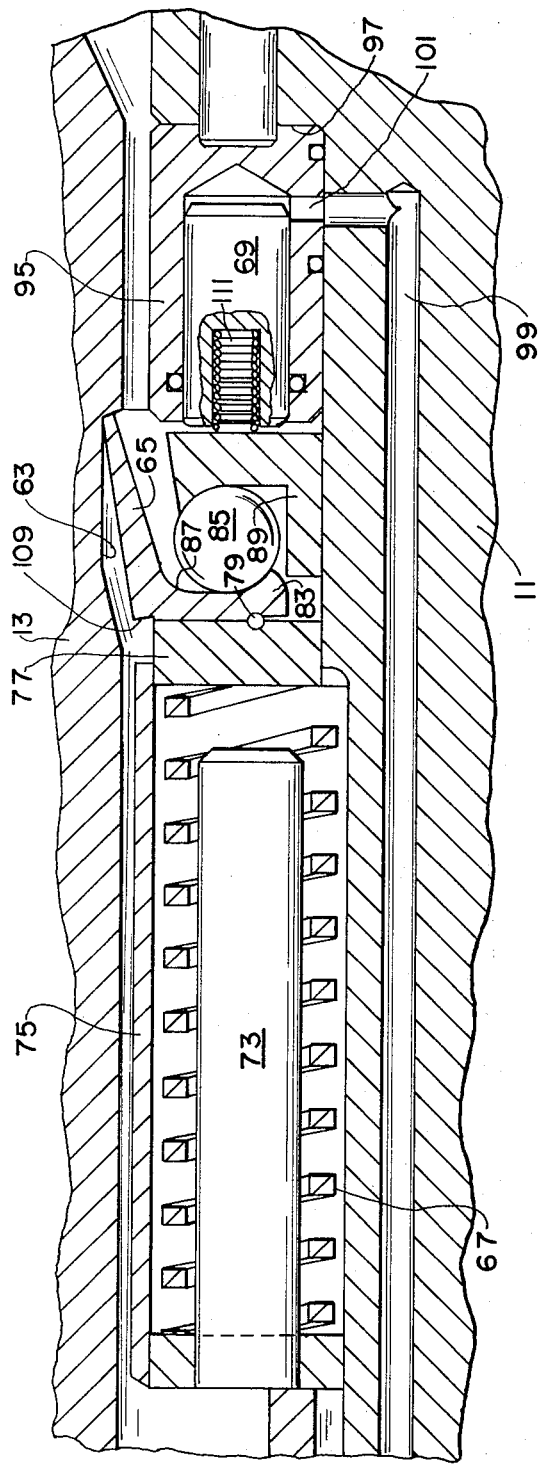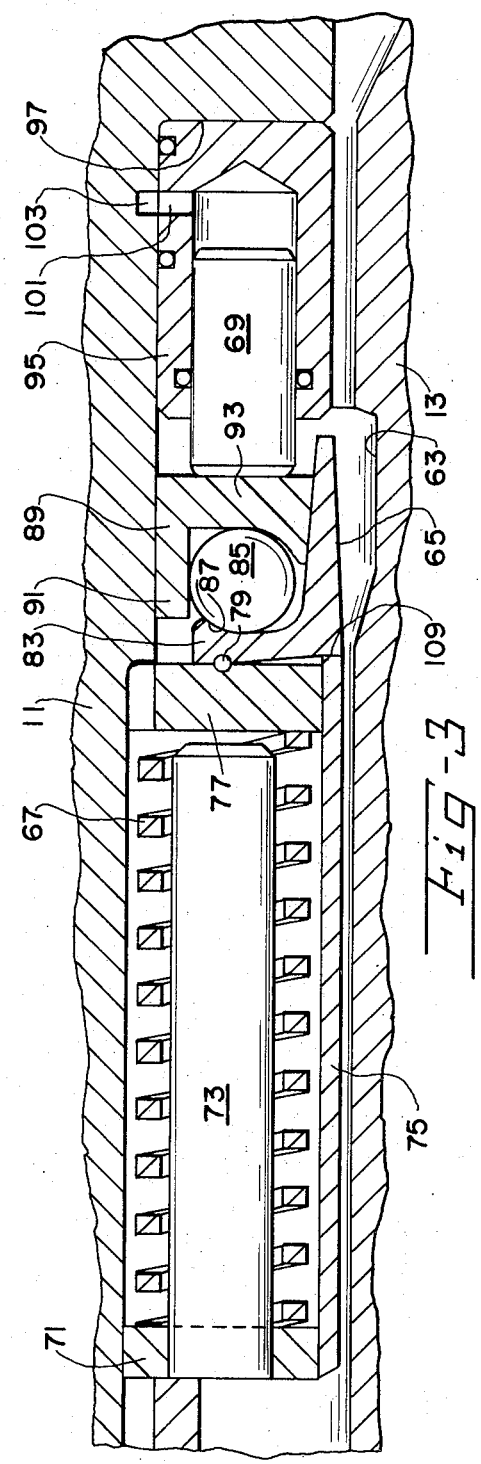

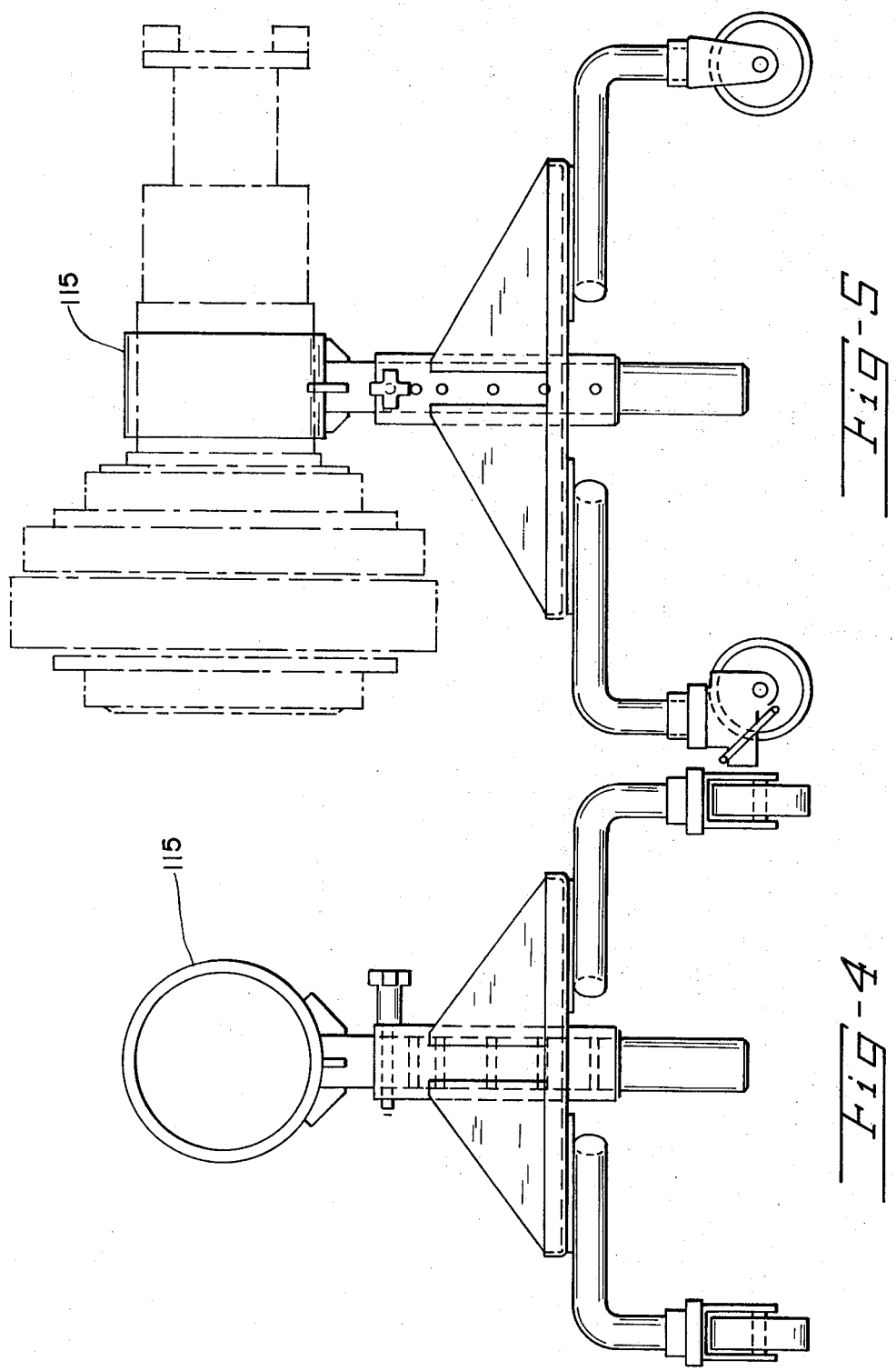

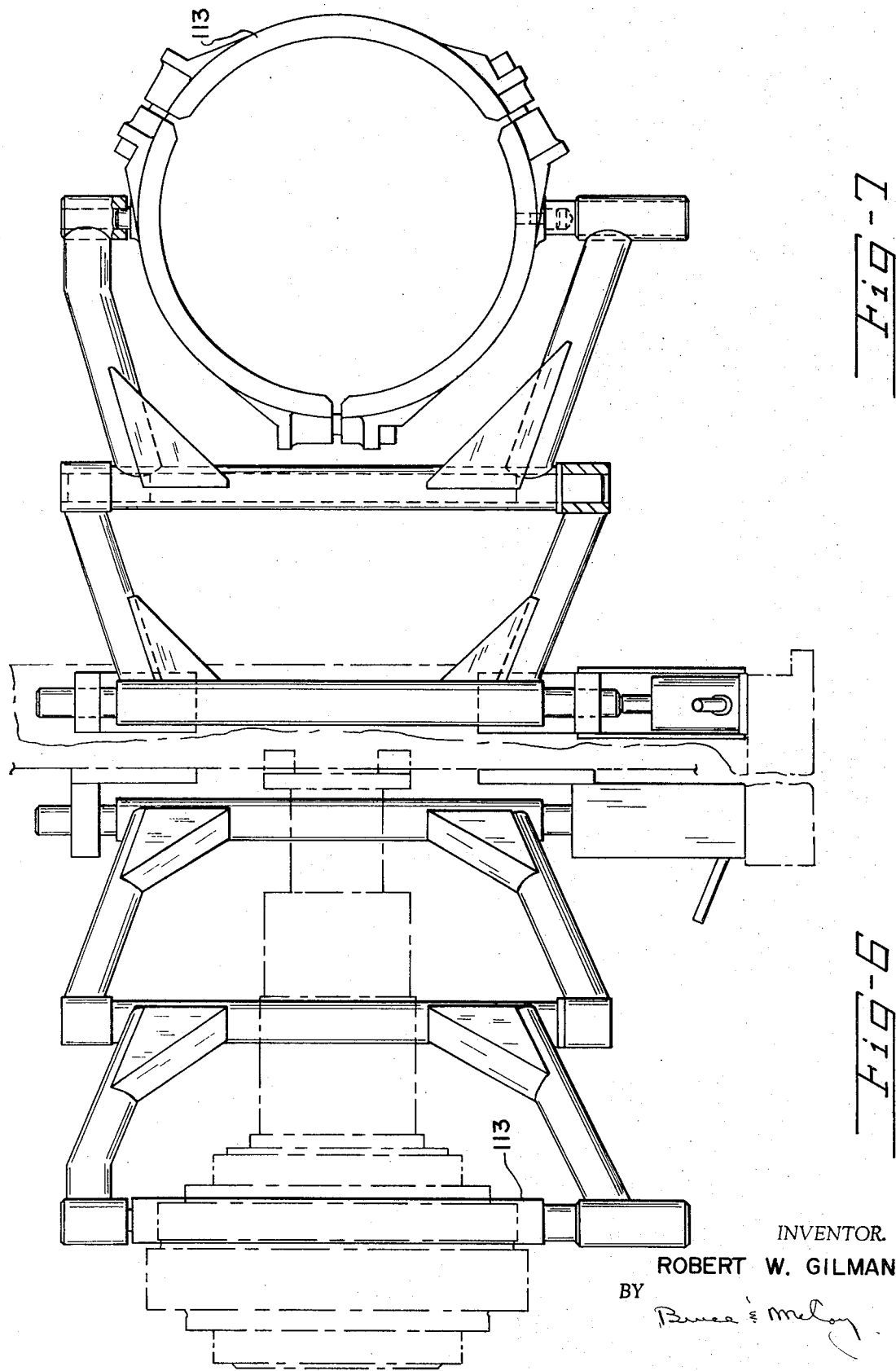

INVENTOR.
ROBERT W. GILMAN

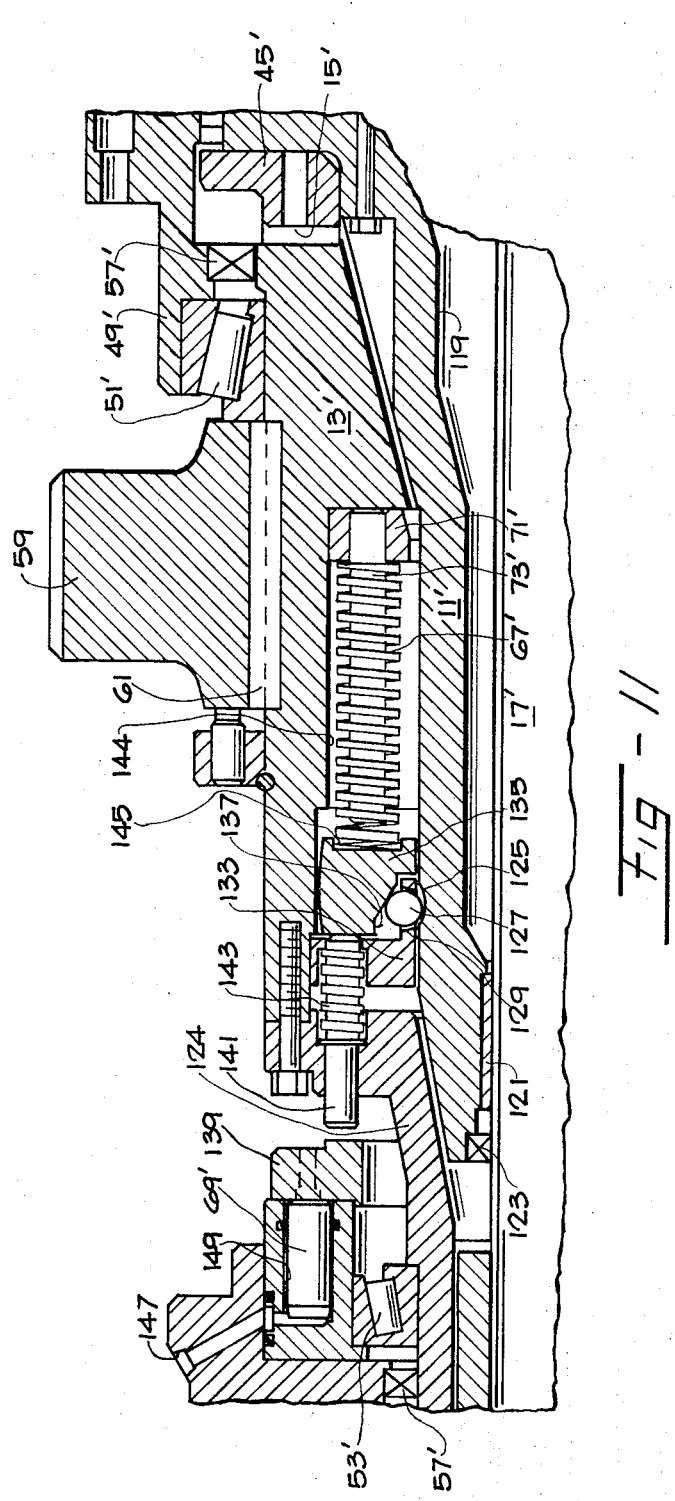

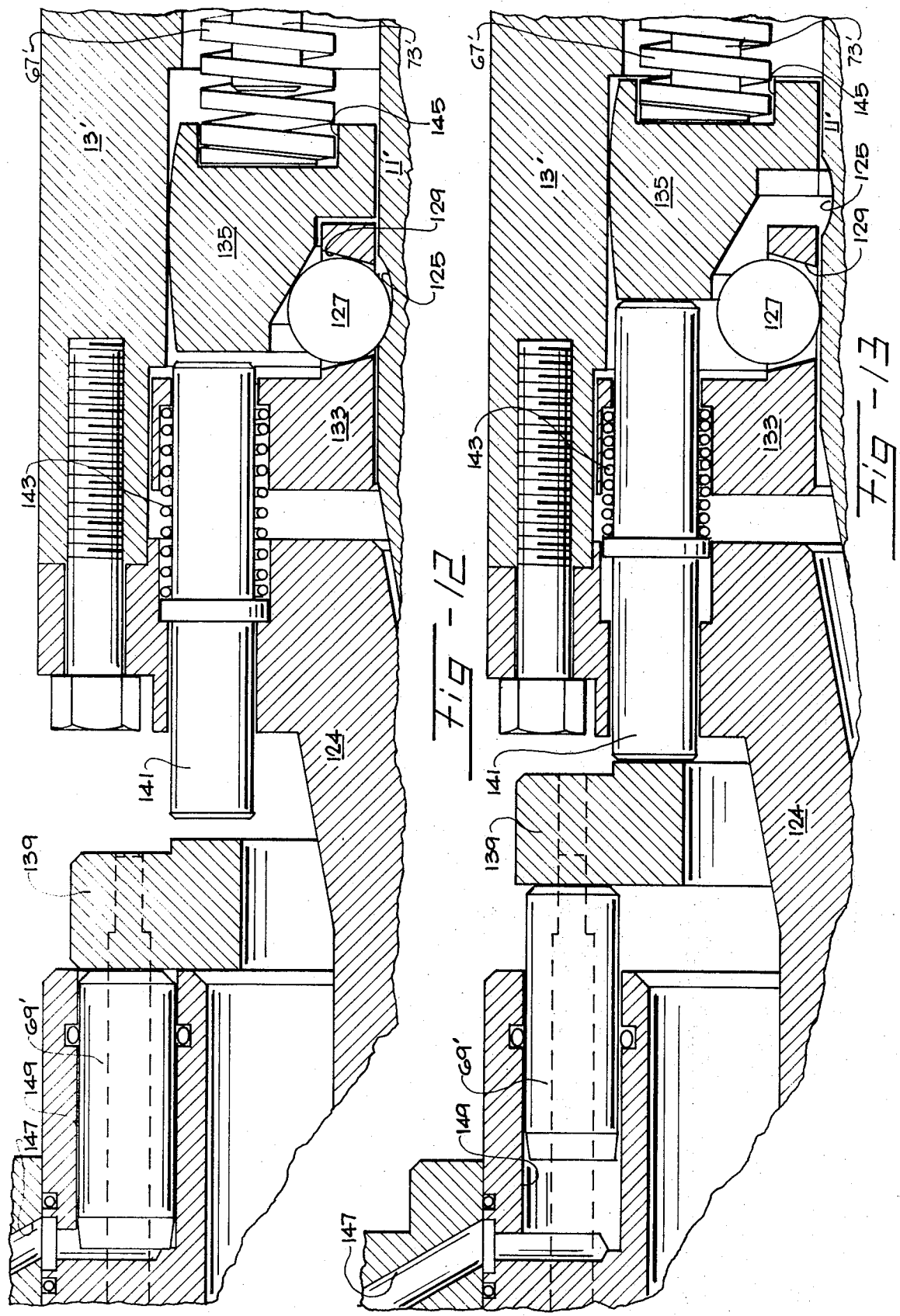

3,825,387

QUICK-CHANGE DIE AND ROLLER ASSEMBLY

CROSS-REFERENCE TO RELATED APPLICATIONS

This application is a continuation-in-part application of copending U.S. Pat. application Ser. No. 141,303, filed May 7, 1971, for QUICK-CHANGE DIE AND ROLLER ASSEMBLY, now abandoned.

BACKGROUND OF THE INVENTION

1. Field of the Invention

The present invention relates generally to pellet mills and, more particularly, to a quick-change removable die and roller assembly.

2. Description of the Prior Art

The two closest known references which describe a quick-change removable die and roller assembly re U.S. Pat. Nos. 2,981,212 and 3,139,844 to H. S. Landers for QUICK-CHANGE ROLLER DIE ASSEMBLY issued Apr. 25, 1961, and July 7, 1964, respectively.

In the art of building pellet mills, one of the problems has been the necessity of changing dies often to change the size of the pellets produced. This can occur several times per day during production. To change dies in the past, it was necessary to partially disassemble the machine by removing the extrusion rollers, and removing the die, before the dies could be switched and the mill reassembled. This is a time-consuming procedure which causes considerable down time for the machine and, therefore, a loss of production. It is obvious that it is important to avoid down time and reduce it wherever possible.

The novel approach taught by the Landers patents for shortening the down time is to remove both the die and the extrusion roller assembly as a unit and to replace the whole assembly with a new die and roller assembly. With the pellet mill back in operation, the more difficult job of further disassembly of the die and shaft which have been removed to replace a worn out die is carried out, and a new die is placed on the shaft for reinsertion in the machine when the working die in the machine needs replacement.

The patents to Landers show the initial attempts at designing a machine which operates in this manner. However, the method of securing the die and roller assembly in the machine by means of threads and a force fit is still considered inefficient. Applicant's invention provides a new and novel quick-change die and roller assembly for a pellet mill, which can be more quickly removed than any heretofore known.

SUMMARY OF THE INVENTION

The present invention is a quick-change die and roller assembly pellet mill, which in combination comprises: a housing; a roller shaft secured to the housing and fixed thereby against rotation for supporting extrusion rollers internally of the die; an inner quill shaft rotatably mounted with respect to and surrounding the roller shaft for rotation therearound, the inner quill shaft having a die secured thereto around the extrusion rollers; a drive shaft or outer quill shaft rotatably supported by the housing and surrounding the inner quill shaft; a biasing means interconnecting the inner quill and drive shafts and formed for quick release; and means for overcoming the biasing means whereby the inner quill shaft, die and roller shaft may be released and withdrawn from the drive shaft.

The invention also includes the method of providing a quick-change die for a pellet mill, which comprises: mounting the die on a removable shaft which has, or cooperates with, a biasing means for securing the shaft in the pellet mill; overcoming the biasing means by fluid pressure to release the shaft from its engagement with the mill; and removing the shaft with the die attached thereto from the mill.

OBJECTS OF THE INVENTION

It is therefore an important object of the present invention to provide a quick-change pellet mill die.

It is another object to provide a new method for effecting a quick change of a pellet mill die.

It is a further object of the present invention to provide a quick-change die for a pellet mill which can be released from the pellet mill and removed by the application of fluid pressure.

It is yet another object of the present invention to provide a quick-change die and roller assembly for a pellet mill wherein the shaft to which the die is secured is engaged in the pellet mill by a biasing means which is formed for quick release.

It is yet a further object of the present invention to provide a quick-change die and roller assembly for a pellet mill wherein the removable shaft includes a plurality of pivotable segments which can be biased into and out of engagement with a groove formed internally of the pellet mill.

It is still another object of the present invention to provide a quick-change die and roller assembly for a pellet mill wherein the segments of the shaft which engage the groove formed internally of the pellet mill can be operated by fluid pressure.

And it is still a further object of the present invention to provide a quick-change die and roller assembly for a pellet mill wherein the removable shaft includes a groove engagable by a plurality of balls held in the pellet mill.

Other objects of the invention will become obvious when the invention is considered in connection with the following drawings.

DESCRIPTION OF THE DRAWINGS

FIG. 1 is a partial section in side elevation of a pellet mill, showing one embodiment of the present invention;

FIG. 2 is an enlarged partial section of FIG. 1, showing the actuating mechanism of the segments of the present invention in engaged position;

FIG. 3 is the same as FIG. 2, showing the fluid pressure operated means overcoming the means biasing the segments into the engaged position;

FIG. 4 is a front elevation of a carrying device for the quick-change die and roller assembly;

FIG. 5 is a side elevation of the same carrying device, showing the removed die and roller assembly being supported therein in phantom line;

FIG. 6 is a side elevation of the gimballed crane of the present invention for removing the die and shaft from the pellet mill;

FIG. 7 is a front elevation of the gimballed crane;

FIG. 11 is a partial section in side elevation of a pellet mill showing a further embodiment of the invention;

FIG. 12 is an enlarged partial section of the actuating mechanism of FIG. 11 in the unpressurized engaged position; and FIG. 13 shows the actuating mechanism in the pressurized release position.

DESCRIPTION OF THE PREFERRED EMBODIMENT

Figure 8:
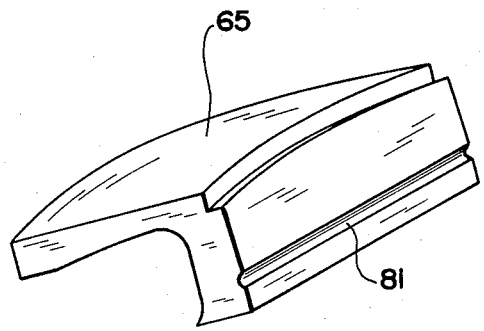
FIG. 8 is a perspective view of one of the expandable segments.
Figure 9:
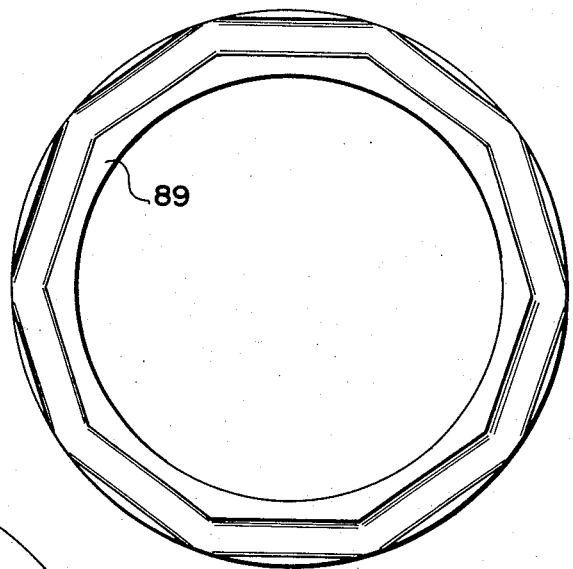
FIG. 9 is a front elevation of the annular pivot plate.

In a pellet mill for which the present invention is employed, there are three nested coaxial shafts. The outer two shafts are called quill shafts. A quill shaft is a hollow shaft inside of which another shaft revolves with respect to the surrounding shaft.

Referring to FIG. 1 of the drawings, there shown is one embodiment of invention including inner and outer quill shafts 11, 13 engaged together by means of a gear interface 15 which effects a mechanical interference fit between the two shafts. The central or roller shaft 17, which is nested inside the two quill shafts, is fixed against rotation by a shear pin 19 which engages a flange 21 splined at 23 to the rear end of the roller shaft 17 and held against lateral movement by a clip ring 25 and washer 27.

Mounted on a yoke on the working or front end of the roller shaft are two or more rollers (29) (not fully shown) which are similar to the rollers disclosed in the Landers patents. These rollers are disposed to rotate internally of the die 31 of the pellet mill, whereby, as the die rotates around the rollers, the rollers rotate on the interior annular working surface 33 of the die and thereby extrude material outwardly through radially formed holes in the die.

A collar 35 surrounds the front end of the roller shaft, whereby bearing races 37 can be mounted thereon for journaling the roller shaft 17 inside the inner quill shaft 11. A rotational seal 39 is also provided around the collar to prevent oil from escaping from the bearings out into the feed material and to prevent feed material from penetrating into the bearings from the extrusion area. The rear end of the roller shaft is also provided with similar bearings 41 for journaling the roller shaft inside the inner quill shaft and with a seal 43 to prevent the escape of any lubricating fluid from the machine.

The inner quill shaft 11 has a ring gear 45 secured to the rear side of a flange formed thereon. The gear face is actually machined to face directly rearward and engage a similar gear face formed on the forward end of the outer quill shaft or drive shaft 13 at the interface 15. A seal 43 is likewise provided to prevent feed material from penetrating into the gear interface area of the quill shafts.

The drive shaft, or outer quill shaft 13, is journaled at its front end with respect to the frame or housing 49 of the pellet mill by roller bearings 51 and is likewise journaled by roller bearings 53 to the back of the housing 49 of the pellet mill. Seals 57 are also provided adjacent these bearings to prevent lubrication from escaping into the extrusion area of the pellet mill.

A drive gear 59 is keyed at 61 to the periphery of the outer quill shaft, or drive shaft, and engages a driven second drive gear (not shown) which rotates the drive shaft. When the drive shaft 13 is rotated by the drive gear, the interconnection of the outer quill shaft and the inner quill shaft through the gear interface 15 forces the inner quill shaft 11 to rotate with the drive shaft and thereby rotate the die 31 around the rollers 29 which are journaled on the roller shaft 17.

The engaged gears on the drive shaft and the inner quill shaft are brought into engagement at the interface 15 and held together by a biasing means which interconnects the quill and drive shafts and is formed for quick release. A fluid operated means is provided for overcoming the biasing means whereby the quill shaft, the die, and the roller shaft may be withdrawn from the drive shaft.

The drive shaft 13 includes an internally formed groove 63, and one preferred form of the biasing means comprises a plurality of pivotable, generally L-shaped segments 65 which can be biased into and out of engagement with the internal groove formed in the drive shaft (see FIGS. 2 and 3). The segments, in effect, form a portion of an annular expansion member surrounding the quill shaft which can be pivotably biased outwardly therefrom into the groove engagement position. A plurality of springs 67 bias the segments outwardly into the engagement position, and a plurality of fluid operated reciprocating pistons 69 act on the segments against the biasing action of the springs to pivotably contract the segments inwardly toward the hollow shaft to the release position and out of engagement with the internal groove.

An annular ring 71 surrounds the inner quill shaft and supports a plurality of spring alignment pins 73. These pins project forward from the annular ring and are aligned with the axis of the shaft. One of the helical coil springs 67 surrounds each one of the pins and abuts at the rearward end thereof against the annular ring member 71.

An annular sleeve 75 surrounds all of the coil springs and the quill shaft, and is secured at its rearward end to the annular ring member 71 supporting the spring alignment pins. At the forward end of each of the springs is a slidable annular pivot plate 77 which surrounds the outside surface of the inner quill shaft 11. This annular pivot plate is disposed within the space between the annular sleeve and the outside surface of the inner quill shaft. The rear surface of the pivot plate abuts the front end of all of the helical spring members. The pivot plate is freely slidable in either direction along the inner quill shaft inside the annular sleeve.

Figure 10:
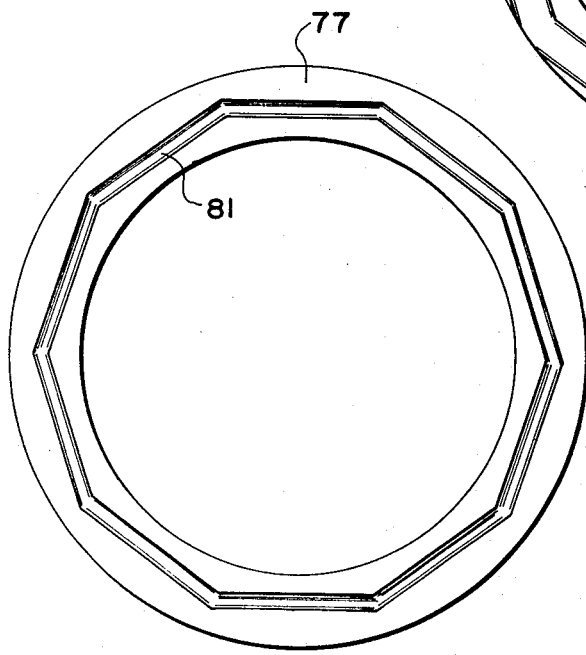
FIG. 10 is a front elevation of the L-shaped ring member.

A plurality of locator or pivot pins 79 are held in semi-circular grooves 81 formed adjacent the periphery on the front surface of the annular pivot plate and in the backs of the segments 65. The semi-circular grooves 81 formed on the annular plate are preferably formed as straight interconnected line segments spaced inwardly of the outer periphery, and there are the same number of these grooves as there are pivot pins to be held therein (FIG. 10).

The grooves at the back of the foot 83 of each generally L-shaped segment 65 is preferably of a smaller arc than one-half of the locator pin 79 over which it rests, but shown as being approximately the same size for convenience, thereby permitting only a portion of the locator pin adjacent thereto to fit into this groove. In this manner, the L-shaped segments are able to pivot about the locator pins with respect to the annular pivot plate, toward and away from the internal groove 63 formed in the outer quill shaft 13.

The segments are retained in their operative positon with respect to the annular plate by means of cylindrical rollers 85 coacting with cam faces 87 formed on the forward surface of the foot 83 of the L-shaped segment. In other words, the cam face is formed on the side which is disposed away from the annular pivot plate.

Forward of the rollers is an annular sliding L-shaped ring member 89 which surrounds the inner quill shaft and is in abutment with the rollers 85. The lower flange, or foot 91, of the L-shaped ring member is disposed to fit under the roller with the leg 93 of the L-shaped ring member abutting the forward periphery point of the tangency of the roller.

The forward surface of the sliding L-shaped ring member 89 bears against a plurality of fluid operated, preferably hydraulically operated, reciprocating cylindrical pistons 69. These pistons are disposed in an annular ring member 95 which also surrounds the quill shaft forwardly of the engagement assembly, with its forward surface 97 abutting a flange formed on the quill shaft. Hydraulic fluid communicates with the forward end of each piston through a communication channel 99. O-ring seals are provided to seal the pistons within the annular ring member and on both sides of the inlet supplying fluid to the ends of the pistons.

In the embodiment shown in FIGS. 1-3, individual communication holes 101 are drilled through the inner surface of the annular ring member to communicate with the forward end of each piston chamber. At the same time, a groove 103 is formed around the outside surface of the inner quill shaft 11 to communicate with each of the communication holes formed in the annular ring member. The single communication channel 99 extends rearwardly of the groove through the inner quill shaft to the rear end thereof and connects to a hydraulic fitting 107 extending from the rear end of the inner quill shaft. At the end of the hydraulic fitting is a valve which permits the force of hydraulic pressure to be applied to the valve to actuate the pistons or to release the pressure on the pistons. When the hydraulic source is removed, any fluid which is in the system will be retained therein. In other words, the pistons will remain in the same position, either retracted or extended, and the valve does not permit the further passage of fluid into or out of the system once the pressure source is removed.

In the normal, unpressurized condition, as shown in the upper portion of FIG. 1 and by FIG. 2 of the drawings, the plurality of helical springs 67 mounted on the alignment pins exert forward presssure on the slidable annular pivot plate 77 which holds the locator pins 79 for the segments 65. This annular plate equalized the pressure of the springs and forces the cam surface of the segments against the rollers. Because of the pressure of the rollers being off center with respect to the pivot pins, the segments pivot backwards so that the outer rear surface of the foot of the L-shaped segments abuts the forward surface of the annular pivot plate. The segments pivot about the locator pins, which ride in the grooves formed in the forward edge of the plate member. When in this position, the leg portion of the L-shaped members extends outwardly from the quill shaft to engage the groove formed in the internal surface of the drive shaft. The enagement prevents the inner quill shaft and roller shaft from sliding forwardly and out of engagement with the drive shaft. This locking of the inner quill shaft with respect to the drive shaft, against longitudinal movement, also locks the gear faces formed on the two shafts into engagement, whereby roatation of the drive shaft effects rotation of the inner quill shaft.

In order to remove the inner quill shaft and roller shaft from the pellet mill, it is only necessary to remove the shear pin 19 at the rear end of the roller shaft and apply hydraulic pressure to the pressure fitting 107 extending from the rear end of the quill shaft. This has the effect, as shown at the bottom of FIG. 1 and in FIG. 3, of forcing the individual pistons 69 rearwardly against the sliding L-shaped ring member 89. This, in turn, forces the roller 85 against the cam surface 87 of the segments which forces the annular pivot plate 77 to be driven rearwardly inside the annular sleeve 75. When the pivot plate has been driven far enough rearwardly by the action of the piston, the annular sleeve 75 engages the outer peripheral corners 109 of the L-shaped segments at the outside junction of the foot and leg portions of the segments to rotate the foot of the segments about the locator pins, whereby the segments are retracted with respect to the quill member and out of engagement with the internal groove 63 formed in the drive shaft or outer quill member. The hydraulic power source is then disconnected and the die and roller shaft can be pulled forwardly out of the machine. This hydraulic system for unlocking the two shafts is actuated remotely from the pistons by the pressure fitting 107.

Springs 111 are provided inside the pistons 69 to keep the elements of the assembly engaged when the fluid pressure is removed and to prevent the pivot pins 79 from dropping out.

Referring now to FIGS. 11 through 13 of the drawings, there shown is a second embodiment of the quick-change die and roller assembly of the present invention. This embodiment also includes inner and outer quill shafts 11', 13' engaged together by means of a gear interface 15'. A central or roller shaft 17' is nested inside these two quill shafts, and fixed against rotation by a shear pin (not shown), in exactly the same manner as described in connection with the previous embodiment of the invention.

The working or front end of the roller shaft also includes the same elements described previously and no change in function of these elements is envisaged by this embodiment of the invention.

A collar (not shown) surrounds the front end of the roller shaft 17' and bearing races, similar to 37 shown in FIG. 1, are mounted thereon for journaling the roller shaft inside the inner quill shaft 11'. A rotational seal (not shown) may also be provided adjacent the collar to prevent the passage of oil from the bearing of feed materials into the bearing.

As shown in FIG. 11, the inner quill shaft 11' includes an enlarged inner portion 119 circumferencially spaced around the roller shaft 17'. The quill shaft tapers inwardly to a reduced portion which contacts the roller shaft about an annular bearing block 121. An annular seal 123 is provided at the end of the reduced portion to prevent the escape of any lubricating fluid from around the inner quill shaft. It, therefore, can be seen that the inner quill shaft rotates around the fixed roller shaft.

The inner quill shaft 11' includes a ring gear 45' secured to the rear side of a flange formed on the quill shaft. The gear face is machined to face directly rearward and engage a similar gear face formed on the forward end of the outer quill shaft or drive shaft 13' at the interface 15'. A rotational seal (not shown) is likewise provided to prevent feed material from penetrating into the gear interface area of the quill shafts.

The drive shaft, or outer quill shaft 13', is journaled at its front end with respect to the frame housing 49' of the pellet mill by roller bearings 51' and includes an annular extended portion 124 which is likewise journaled by roller bearings 53' to the back of the housing of the pellet mill. Seals 57' are provided adjacent these bearings to prevent lubrication escaping from between the quill shafts.

The drive gear 59 is keyed at 61 to the periphery of the other quill shaft, or drive shaft 13', as described above. When the drive shaft 13' is rotated by the drive gear, the interconnection of the outer quill shaft and the inner quill shaft through the gear interface 15' forces the inner quill shaft 11' to rotate with the driver shaft and thereby rotate the die, as discussed previously.

As with the embodiment set forth in FIG. 1, the engaged gears on the drive shaft 13' and the inner quill shaft 11' are brought into engagement at the interface 15' and held together by a biasing means which interconnects the quill and drive shafts and which is formed for quick release. The preferred form of quick release used in this embodiment also comprises a fluid operated means whereby the quill shaft, the die and the roller shaft may be withdrawn as a unit from within the drive shaft.

To accomplish the above, the outside surface of the inner quill shaft 11' is provided with a groove or recessed area 125 extending around the circumference thereof. The biasing means comprises a plurality of ball shaped elements 127 which can be biased into and out of engagement with the groove 125. The balls are held in a plurality of tapered holes or bores 129 formed in an elongated section 131 of an annular holding member 133, which is, in effect, a portion of extension 124 of the outer quill shaft surrounding the inner quill shaft. The balls are biased into engagement with the groove in the quill shaft by means of an annular locking ring 135 having a tapered inner surface 137 biased into contact with each of the balls. The tapered holes 129 prevent the balls from falling through upon removal of the inner quill shaft.

A plurality of springs 67' act against the locking ring 135 to bias or force the tapered surface 137 of the locking ring into contact or engagement with the ball members 127, to bias the balls into the engagement or locking position in groove 125.

To release the balls, or unlock the ring 135, a plurality of fluid operated reciprocating pistons 69' act on a reciprocating unlocking annular ring 139 surrounding the quill shaft 11'. The unlocking ring 139 acts against a plurality of reciprocating pin elements 141 supported in the annular extension 124 of the outer quill shaft against the action of a further spring biasing means 143. Elements 141 contact locking ring 135 to longitudinally reciprocate the locking ring against the biasing action of the springs 67'.

As the locking ring 135 is moved, the tapered surface 137 thereof moves out of contact with the balls 127, which are then free to move out of the groove 125 to allow removal of the inner quill shaft 11' and roller shaft 17'.

As shown, each of the annular ring members cooperate, so that together with the balls, a holding means is formed which is considered part of or connected with the outer quill shaft or drive shaft 13'. The holding means also includes an annular ring member 71' held in a groove or enlarged inner portion 144 formed within the outer quill shaft. The ring member 71' supports a plurality of spring alignment pins 73', which project from the annular ring toward the rear of the pellet mill in alignment with the axis of the roller shaft 17'. One of the helical coil springs 67', surrounds each one of the alignment pins, with the inner end of each spring held within a blank bore 145 formed in the rear end of the ring member 135.

For release of the quick release holding means of the embodiment of FIGS. 11–13, air or fluid pressure is applied to an inlet 147 for passage into a plurality of chambers 149 spaced around the outer quill shaft, so as to bias pistons 69' toward the right or working surface of the pellet mill. The pistons contact the unlocking ring 139, which equalizes the force applied thereto. The unlocking ring moves into contact with the ends of the pin elements 141 to move these elements against the biasing action of springs 143 into contact with the facing surface of locking ring 135. The locking ring moves to the right or toward the working surface of the pellet mill, to release the pressure of tapered surface 137 against the ball elements.

With the ring member moved to the right, and the balls in the released or unlocked position (FIG. 3), inner quill shaft 11' and roller shaft 17' may be easily withdrawn from the pellet mill.

The quick-change die and roller assemblies set forth in the above two embodiments — the roller shaft and the quill shaft — can be removed from a machine by attaching a gimballed crane, normally mounted on the pellet mill, to the die. This crane is shown in FIGS. 7 and 8, wherein a ring member 113 is simply tightened around the outside of the die and the whole assembly is then slid forward out of the pellet mill. The die and roller assembly are then aligned with a dolly, shown in FIGS. 4 and 5, whereby it is simply slid into the ring member 115 mounted at the top of the dolly and the ring member of the gimballed crane is then released. The die is simply then transported away and a new one is drawn up on another dolly, picked up by the gimballed crane, inserted into the machine, and the removal steps are simply reversed to secure the die and roller assembly in the machine.

An important feature of the machine is the fact that a safety is provided, whereby if the machine jams by an unextrudable piece of material wedging between the die and the rollers, the rotational force of the two gear faces relative to each other will force the quick-change die and roller forward out of the machine and, in the embodiment of FIG. 1, shear the rear shear pin 19 which holds the roller shaft and inner quill shaft in their position in the machine.

A further important feature is that the hydraulic system of the quick-change die and roller assembly may be easily repaired should a leak develop therein. In the embodiment shown in FIG. 1, three or more equally spaced holes 117 bored around the front end of the inner quill shaft 11 and tapped at the outer ends. These holes are aligned with holes found in the ring member 95 mounted on the inner quill shaft. These three holes, which extend from the front of the quill shaft to the rear of the ring member, carry rods or bolts which may be moved rearwardly by a threaded portion engaged with the inner quill shaft to force the ring member 95 rearwardly. This action moves the pistons 69 rearwardly to thereby mechanically actuate the L-shaped segments to the released position to enable the die and roller assembly to be removed. In the embodiment of FIG. 11, the hydraulic system itself may be removed for repair.

The great advantage of the present invention is that a die can be changed in a matter of seconds by simply applying hydraulic pressure to a fitting, which releases the means holding the die and the inner quill shaft and roller shaft within the outer quill shaft. In the embodiment of FIG. 1, the shear pin 19 must also be removed. With the dies, etc., in the released position, the gimballed crane is put on the front of the die and the assembly is pulled out of the machine. There is no loosening or tightening of any bolts or the necessity of adjusting any tolerances or fits as necessary in systems presently employed.

It is obvious that the invention will achieve the objects attributable thereto, and it is therefore not to be limited, except as may be necessitated by the attached claims.

What is claimed is:

1. A quick-change die and roller assembly, comprising in combination,
    a housing,
    a roller shaft secured to said housing and fixed thereby against rotation for supporting extrusion rollers internally of the die,
    an inner quill shaft rotatably mounted with respect to and surrounding said roller shaft for rotation therearound, said quill shaft having said die secured thereto around said extrusion rollers,
    a drive shaft or outer quill shaft rotatably supported by said housing and surrounding said inner quill shaft, either said drive shaft or said inner quill shaft including an annular groove formed on one of said shafts,
    a plurality of elements mounted on the other of said shafts which can be moved into and out of engagement with the groove on the one shaft, said elements being biasable from said shaft into the groove on the other shaft,
    a plurality of springs biasing said elements into said engagement position with said groove,
    a plurality of fluid operated reciprocating pistons formed to act when activated against the biasing action of said springs to contract said elements to the released position out of engagement with the internal groove of said shaft, and
    means interconnecting said inner quill shaft and said outer quill or drive shaft by a mechanical interference fit when said shafts are biased longitudinally towards each other, said interconnection not being a force or friction fit and not requiring a separation force in excess of that to simply move the parts apart when the force biasing said shafts is removed and not requiring a torque to remove the biasing force,
    means for remotely actuating the pistons whereby said inner quill shaft, said die, and said roller shaft may be disengaged and withdrawn from said drive shaft by simply pulling the inner and outer quill shafts apart.

2. The quick-change die and roller assembly of claim 1 wherein
    said elements are segments which in effect form a portion of an annular expansion member mounted on the inner quill shaft and which can be pivotally biased outwardly from said inner quill shaft into the groove which is formed internally of the drive shaft,
    said plurality of springs are mounted on said inner quill shaft,
    an annular ring surrounds said quill shaft and is disposed between each of said segments and said springs to bias said segments into the expanded condition,
    said plurality of pistons oppose the mechanical effect of said spring pressure on said segments, and
    said fluid operated means is formed for simultaneous actuation of said pistons to overcome said spring pressure and retract said segments around said quill shaft.

3. The quick-change die and roller assembly of claim 1, wherein each of said elements is a ball held in an annular holding member surrounding the groove formed around said inner quill shaft, said balls being biased inwardly toward said inner quill shaft and into said groove for engagement in said groove.

4. The quick-change die and roller assembly of claim 3, including an annular locking ring having an inclined inner surface acting against said balls for biasing said balls into said groove.

5. The quick-change die and roller assembly of claim 4, including a plurality of springs biasing said locking ring against said balls.

6. The quick-change die and roller assembly of claim 5, wherein a plurality of fluid operated reciprocating pistons are provided to move said locking ring to the unlocked position, against the biasing action of said springs, to allow said balls to move out of said groove.

7. The quick-change die and roller assembly of claim 6 further including an unlocking ring surrounding said inner quill shaft, said unlocking ring disposed adjacent said pistons,
    a plurality of pin elements slidably supported in said holding ring within said outer quill shaft, said pin elements extending between said unlocking ring and said locking ring whereby, upon actuation of said pistons by the application of fluid pressure thereto, said unlocking ring, pin elements and locking ring will be moved to the unlocked position.

8. The quick-change die and roller assembly of claim 1, wherein said roller shaft includes an end flange keyed thereto, said end flange having a receptacle for a shear pin, and a shear pin reciprocatably mounted on the housing to engage the receptacle in said flange to prevent rotation of the roller shaft.

9. The quick-change die and roller assembly of claim 8, wherein said drive shaft includes an internally formed groove and said means for engagement of the drive shaft with the quill shaft comprises a plurality of pivotable segments which can be biased into and out of engagement with said internal groove.

10. The quick-change die and roller assembly of claim 1 wherein said drive shaft includes a drive gear secured to the outside surface thereof and said inner and outer quill shafts include opposing meshed gear interfaces, whereby when said quill shaft and roller shaft are secured therein and biased longitudinally towards each other to mesh the gear interfaces and said drive gear is operated, said drive shaft will be rotated to thereby rotate said quill shaft and said die.

11. A quick-change die and roller assembly for a pellet mill, comprising, in combination, a housing, a roller shaft secured to said housing for supporting extrusion rollers and generally disposed extending along the central longitudinal axis of said housing, a rear flange splined to said roller shaft and having a receptacle for a shear pin formed therein, a shear pin mounted on said housing for reciprocating engagement of said flange receptacle to prevent said rear flange and, thereby, said roller shaft from rotating with respect to said housing, an inner quill shaft rotatably mounted with respect to and surrounding said roller shaft, a die secured to said inner quill shaft for rotation therewith around the extrusion rollers mounted on the roller shaft, an annular ring surrounding said inner quill shaft and supporting a plurality of spring alignment pins aligned with the axis of said shaft, a spring surrounding each of said alignment pins, an annular sleeve secured to said annular ring and surrounding said alignment pins and said springs, a slidable annular plate surrounding said inner quill shaft within the space between said annular sleeve and the outside surface of said inner quill shaft, said annular plate being disposed in an abutting relationship with said springs, a plurality of locator pins held in said annular plate, a plurality of pivotable segments having cam faces formed on the surface disposed away from said annular plate, said segments straddling said locator pins and pivoted on said annular plate and being normally biased into an expanded position to project outwardly from the surface of said inner quill shaft by the action of said springs, a plurality of rollers disposed against the cam faces of said segments, an annular sliding L-shaped ring member surrounding said inner quill shaft and disposed between said shaft and said rollers and in abutment with said rollers, a plurality of hydraulically operated reciprocating pistons disposed on said inner quill shaft and which act against said L-shaped ring members, said rollers, and against the biasing force of said springs to compress said springs to slide said L-shaped ring along said shaft inside said annular sleeve when said pistons are activated whereby said sleeve engages said segments and rotates them about said locator pins into the contracted position, an outer quill or drive shaft rotatably supported within said housing and having an inner groove formed on the inner surface thereof, said outer quill shaft surrounding said inner quill shaft with said inner quill shaft being removably disposed therein by the coaction of said outwardly expanded pivoting segments with said inner groove, said inner quill shaft being capable of being withdrawn from said outer quill shaft when said segments are pivoted inwardly or contracted by the action of said reciprocating pistons, and engaged interface gears mounted on and secured to said inner and outer quill shafts whereby when said drive shaft is rotated, said inner quill shaft and said die will be rotated about said roller shaft.

12. A quick-change die and roller assembly for a pellet mill, comprising, in combination, a housing, a roller shaft secured to said housing for supporting extrusion rollers and generally disposed extending along the central longitudinal axis of said housing, a rear flange splined to said roller shaft and having a receptacle for a shear pin formed therein, a shear pin mounted on said housing for reciprocating engagement of said flange receptacle to prevent said rear flange and, thereby, said roller shaft from rotating with respect to said housing, an inner quill shaft rotatably mounted with respect to and surrounding said roller shaft, a die secured to said inner quill shaft for rotation therewith around the extrusion rollers mounted on the roller shaft, an annular ring mounted in an outer quill shaft surrounding said inner quill shaft and supporting a plurality of spring alignment pins aligned with the axis of said shaft, a spring surrounding each of said alignment pins, a reciprocating annular locking ring mounted on said outer quill shaft surrounding said inner quill shaft, said locking ring having a tapered inner surface and being disposed in an abutting relationship with said springs, a plurality of balls mounted within a holding member surrounding said inner quill shaft and being normally biased into a groove formed around said inner quill shaft by the action of said springs against said locking ring, an annular sliding unlocking ring surrounding said inner quill shaft, a plurality of reciprocating pin elements disposed between said locking and unlocking rings, a plurality of hydraulically operated reciprocating pistons disposed around said outer quill shaft and which act against said unlocking ring, said pin elements, said locking ring, and against the biasing force of said springs to compress said springs to slide said locking ring along said inner quill shaft when said pistons are activated whereby said tapered inner surface of the locking ring is moved away from said balls, said outer quill shaft being rotatably supported within said housing surrounding said inner quill shaft with said inner quill shaft being removably disposed therein by the coaction of said balls with said groove, said inner quill shaft being capable of being withdrawn from said outer quill shaft when said balls are released by the action of said reciprocating pistons, and engaged interface gears mounted on and secured to said inner and outer quill shafts whereby when said driveshaft is rotated, said inner quill shaft and said die will be rotated about said roller shaft.

* * * * *